United States Patent

Straubel

[15] 3,648,677
[45] Mar. 14, 1972

[54] INTERNAL COMBUSTION ENGINE WITH CONTROLLED LUBRICATION SUPPLY

[72] Inventor: Max Straubel, Munich, Germany

[73] Assignee: Zundapp-Werke GmbH, Munich, Germany

[22] Filed: Aug. 29, 1969

[21] Appl. No.: 854,166

[30] Foreign Application Priority Data

Nov. 27, 1968 Germany..................P 18 11 128.9

[52] U.S. Cl..............................123/196 S, 184/6.4, 184/6.28
[51] Int. Cl..........................................................F16n 29/02
[58] Field of Search....................184/6 C, 6 D, 6 Y, 27 R, 29; 123/196, 196 S; 74/501

[56] References Cited

UNITED STATES PATENTS

| | | | |
|---|---|---|---|
| 1,630,217 | 5/1927 | Rasor | 74/501 X |
| 1,929,010 | 10/1933 | Winter | 123/196 S |
| 3,302,752 | 2/1967 | Shiokawa | 184/6 Y |
| 3,435,914 | 4/1969 | Atsumi | 184/6 Y |

Primary Examiner—Manuel A. Antonakas
Attorney—Wilson & Fraser

[57] ABSTRACT

A coordinated set of controls for a throttle and lubricating pump with a fail-safe feature. In normal operation, the lubricating pump output is a function of the speed setting of the throttle whereby at maximum speed setting the output of the pump is set at its maximum by interconnected linkages. In the event of a failure of the linkages, the lubricating pump is set at its maximum output for all throttle settings.

9 Claims, 8 Drawing Figures

INVENTOR
MAX STRAUBEL
BY Wilson & Fraser
ATTORNEYS

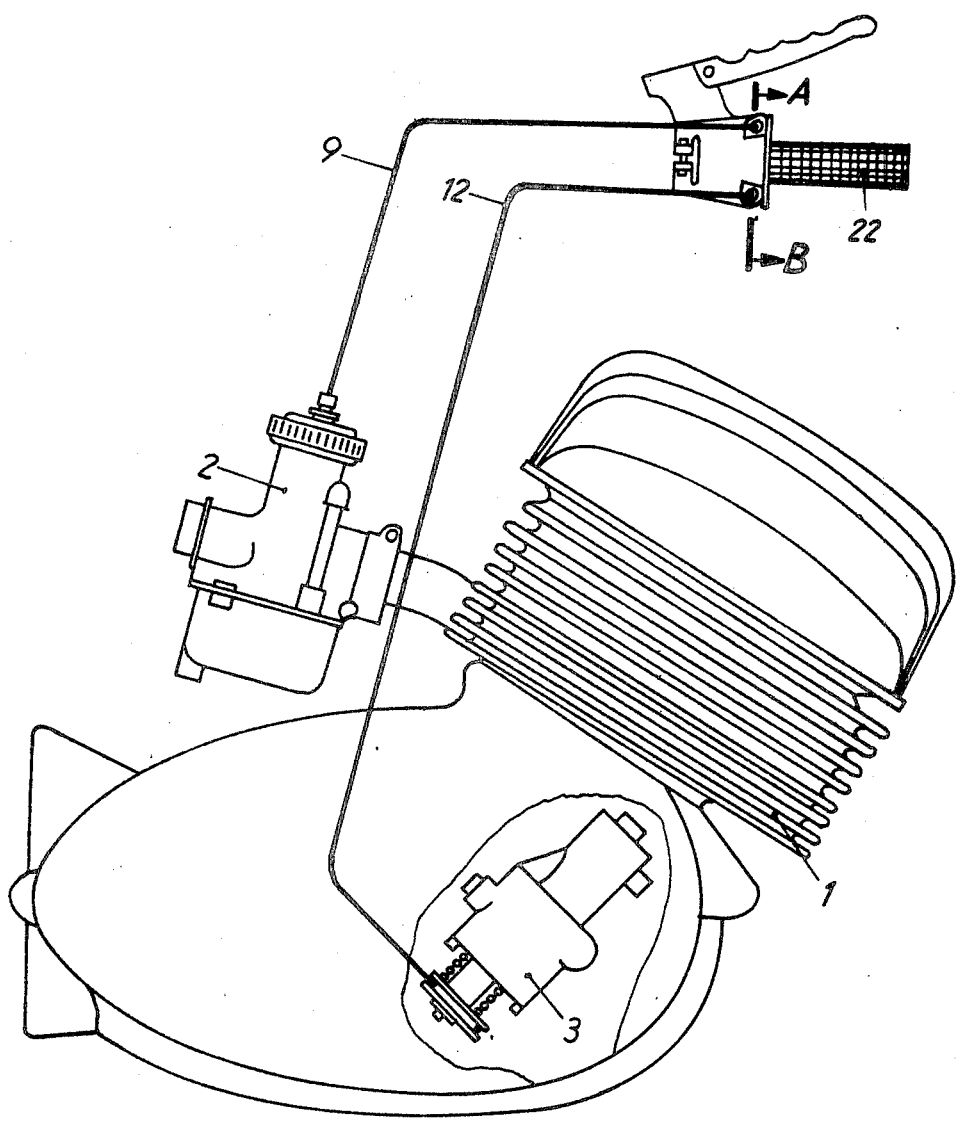

Patented March 14, 1972

INVENTOR
MAX STRAUBEL

BY Wilson & Fraser
ATTORNEYS

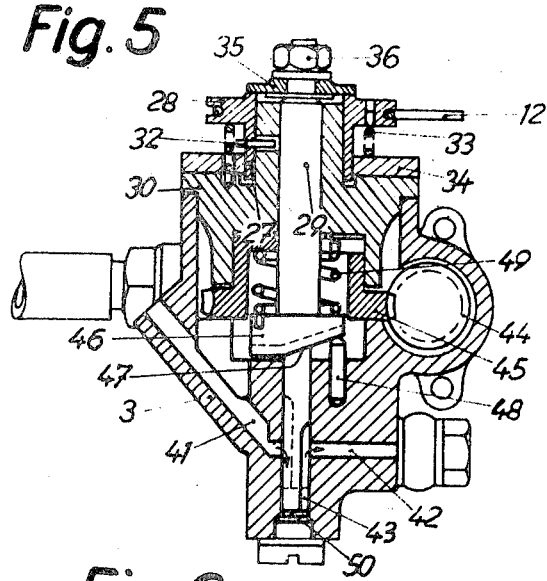
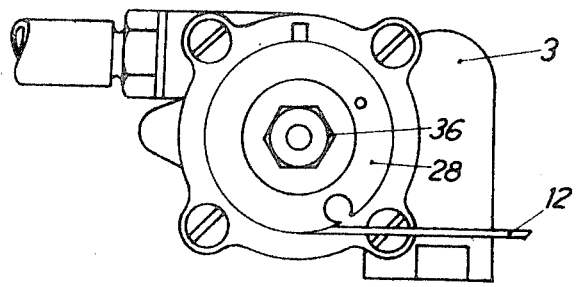

INTERNAL COMBUSTION ENGINE WITH CONTROLLED LUBRICATION SUPPLY

BACKGROUND OF THE INVENTION

This invention relates to internal combustion engines having lubricating oil pumps and more particularly to such engines where the pump output is a direct function of the power setting of the engine control.

DESCRIPTION OF THE PRIOR ART

Lubricating pumps for internal combustion engines have been driven from the crankshaft of the engine. Therefor the pump output is increased with the speed of the crankshaft. It has been known to provide a further degree of variation of lubricating pump output by adjustment of the pump. Pump adjusting means can be coupled to the engine control as to the carburetor so that the quantity of lubricant supplied by the pump for a given number of revolutions of the crankshaft is altered as the engine control setting is altered. For example, the quantity of lubricating oil issued from the pump can be increased for a given number of revolutions of the crankshaft as the speed or power setting for the engine is increased, and conversely the pump output is decreased with reduced speed or power settings. One such arrangement is to bias both the throttle and pump adjusting means to a no-load setting, i.e. low pump output and low throttle setting, as by means of a biasing spring and to adjust the settings against the spring force through a linkage including a flexible cable, such as a Bowden cable, up to the highest settings.

Destructive conditions can occur with the above arrangement where the control linkage breaks or becomes disconnected such that the throttle is maintained in an advanced setting and the lubricating pump is retracted by the biasing means to its no-load or minimum output setting. If the failure of the linkage is not observed and corrected in a short time, the deficiency in the oil supply to the engine destroys it or seriously impairs its operation. Further, in normal operation, a gradual extension of the control cable to the lubricating pump will gradually bring about a reduction in the pump setting for a given throttle setting, thereby lowering the supply of lubricating oil. While this reduction is minor at the outset it can become significant to a degree which impairs operation of the engine.

SUMMARY OF THE INVENTION

This invention avoids the above disadvantages by control linkages and biasing means for the throttle of an internal combustion engine and the lubricating pump therefor which are arranged to bias the pump to the maximum output setting and are linked to a common operating device so that when fully operative the throttle and pump adjusting means are coordinated as a direct function. In this arrangement, the engine is supplied with sufficient oil even if the control train to the lubricating pump malfunctions since the pump is biased to a setting and any failure tends toward a setting for the greatest supply of lubricant.

A feature of the invention involves the use of two Bowden cables from a single operating device to control the throttle and lubricating pump settings.

Another feature is the control operating device comprising a two armed lever having cable couplings for the pump and throttle control cables where a cable is connected to each arm.

Another feature is a control operating device comprising a slide reciprocating within a guide attached to the paired Bowden cables.

Another feature is a rotating handle or handwheel type control for the paired Bowden cables.

Another feature resides in the biasing means for the throttle or carburetor and the lubricating pump in the form of a compression, tension or flexure spring oriented toward minimum setting for the throttle and toward maximum setting for the pump.

A further feature is the construction of the lubricating pump to provide an adjustable stroke by cam adjustment of the piston of the pump through a disc coupled to a rotatable sleeve enclosing a portion of the piston. The head of the sleeve is formed into a cable pulley and is axially displaceable by a camming action to move the disc and thus the piston position along the axis of its cylinder. The cam can be in the form of a helical slot in the sleeve into which a pin extends so that as the sleeve is rotated, the fixed pin riding in the slot causes a displacement of the sleeve along its axis. The sleeve can be biased to one extreme of its range of axial travel by a helical torsion spring coaxially surrounding the sleeve, secured at one end to the sleeve and at the other end to the fixed housing of the pump whereby the spring bias tends to maintain the pump adjusted for maximum stroke.

An object of the invention is to improve internal combustion engines.

Another object is to avoid unsafe operating conditions for internal combustion engines, particularly such conditions arising from insufficient lubrication.

Another object is to coordinate throttle settings with a variable lubrication pump setting in a simple and expeditious manner.

DESCRIPTION OF THE DRAWINGS

FIG. 3 is an internal combustion engine, in which a carburetor serves as a power control, with a lubricating oil pump and its operating device shown diagrammatically;

FIG. 5 is a side elevation of a lubricating oil pump having an adjusting device with portions broken away and sectioned to reveal its internal details;

FIG. 6 is a top view of the lubricating oil pump as shown in FIG. 5;

DESCRIPTION OF THE PREFERRED EMBODIMENTS

Figure 1:
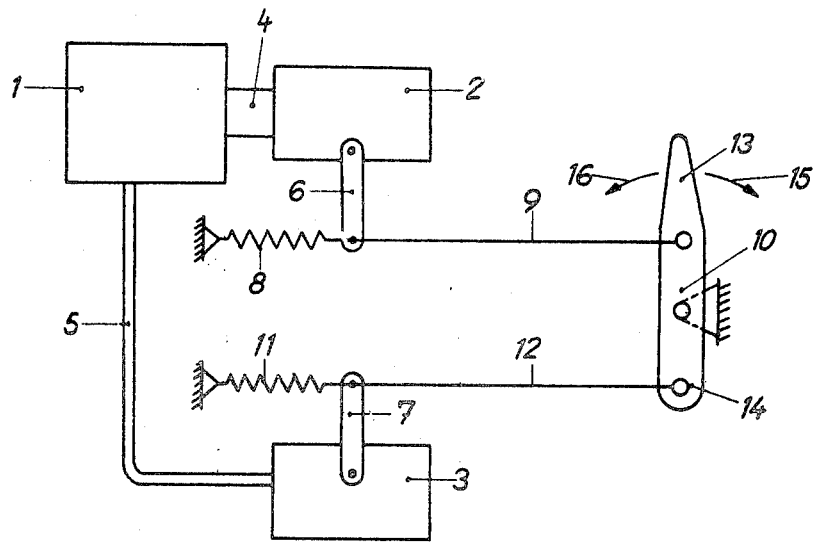
FIG. 1 is a schematic diagram of the lubricating pump, carburetor and throttle, biasing means therefor, lever type, control operating device and control linkages for an internal combustion engine.

An output control element 2, which can be a carburetor, and a lubricating oil pump 3 can be connected to an internal combustion engine 1 through conduits 4 and 5. Control devices, for example the lever arms 6 and 7 are provided for control as a throttle for carburetor 2 and as a stroke adjusting means for pump 3. Carburetor control lever 6 is biased toward its one limit by tension spring 8 and toward its opposite limit by Bowden cable 9 connected to the two armed lever 10.

The tension spring 8 of carburetor 2 is biased toward the no-load setting of the engine 1 and can be opposed and overcome by Bowden cable 9 as displaced by lever 10. Oil pump 3 has its lever 7 biased to the maximum output setting by tension spring 11 and is adjusted by means of Bowden cable 12 and lever 10 to overcome the spring bias and at the position for no load setting of carburetor 2, the pump lever 7 is set for the no load setting or the minimum output per revolution of the engine crankshaft. For movement of control operating device lever 13 in the direction of arrow 15 in FIG. 1, clockwise, lever 6 for the carburetor 2 is moved counterclockwise toward the full load position. Simultaneously, the lubricating oil pump 3 is adjusted to the maximum oil output per engine crank shaft revolution by relieving the tension in spring 11 to permit lever 7 to move counter clockwise. Movement of lever arm 13 in the direction of arrow 16, counter clockwise, sets the carburetor control arm 6 to a reduced load position by the action of spring 8, while lever arm 14 imposes tension on cable 12 and spring 11 to move control arm 7 of the lubricating pump clockwise to a reduced output. Therefore, in the event of a failure, as the breaking of cable 12, the engine will not suffer from lack of oil, since the lubricating oil pump 3 is set automatically and immediately to the maximum output per engine drive shaft revolution setting.

Figure 2:
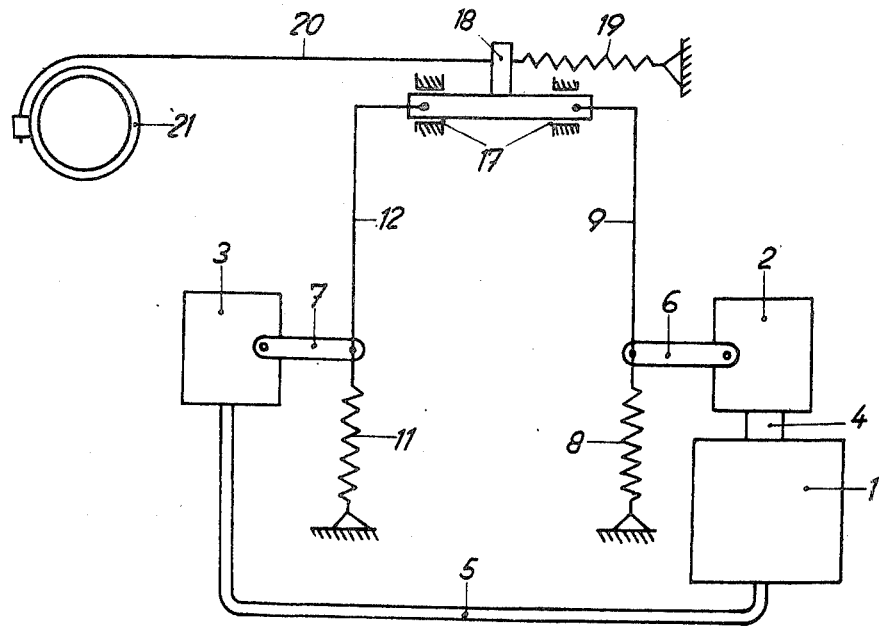
FIG. 2 is a schematic diagram as FIG. 1 showing a cable actuated slide type, control operating device.

In FIG. 2 and subsequent drawings like reference characters refer to corresponding elements of previously discussed figures.

FIG. 2 is similar to FIG. 1 in the construction and arrangement of the lubricating oil supply control means and the dependence of its setting on the setting of the carburetor of an internal combustion engine. Instead of the two armed lever 10 of FIG. 1, the operating device of FIG. 2 is a slider 18 which reciprocates in guide or rail 17. A tension spring 19 biases the slider to the no load setting for the carburetor 2 and pump 3 and can be opposed by tension imposed by Bowden cable 20 attached, for example, to a rotatable handle 21. The Bowden cables 9 and 12 are attached to the opposed ends of slider 18 so that it imparts identical but opposing motion to the cables 9 and 12 with the same effect as two armed lever 10 discussed with respect to FIG. 1. Movement of slider 18 is actuated by cable 20 as force is imposed or relieved to overcome or relieve the tension spring 19.

Figure 4:
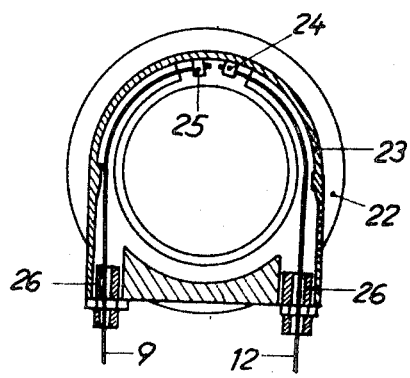
FIG. 4 is a section taken along line A-B of the operating device of FIG. 3.

The internal combustion engine of FIGS. 3 and 4 has controls for the lubricating oil pump 3 and the carburetor 2 connected to rotatable handle or grip 22 so that Bowden cables 9 and 12 move in opposite sense to each other as the handle is rotated. As best seen in the sectioned view of handle 22 in FIG. 4, rotation of handle 22 causes rotation of the internal sleeve section supporting cable connectors 24 and 25 so that cables 9 and 12 are reciprocated with respect to guide sleeves 26 and have their ends carried over an arcuate path within fixed housing 23.

Figure 7:
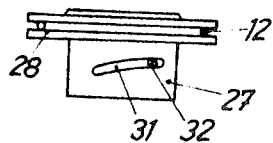
FIG. 7 is a front elevation of the upper portion of the pump of FIGS. 5 and 6 showing a part of the stroke adjusting means.

The lubricating oil pump 3 and its adjusting device are shown in detail in FIGS. 5 to 7. A piston 29 reciprocates in a housing 30 to positively displace lubricant in cylinder 50 in a predetermined quantity according to the length of the piston stroke. A supply duct 41 and a discharge duct 42 each extend to parts in the cylinder aligned with the body of piston 29. The piston body has a passage on its outer face extending parallel to its axis and of restricted circumferential extent whereby the passage selectively provides communication from the ports of ducts 41 and 42 to the open region of cylinder 50 below piston 29. The piston 29 is reciprocated and rotated simultaneously in the cylinder so that the enlargement of the region of cylinder 50 below the piston occurs while passage 43 registers with supply duct 41 and reduction of that region occurs while passage 43 registers with discharge duct 42.

A worm 44 driven by the crankshaft of the engine which is to be lubricated is journaled for rotation in pump housing 30 and engages a cup-shaped worm gear 45. The worm gear 45 is secured to piston 29 so that the piston is rotated therewith and can move axially thereof. A spline coupling (not shown) can be employed for this purpose.

A lift cam 46 is secured to piston 29. Cam 46 is shaped on its underside with a rising face and a falling face to cooperate with a stud 48 or other cam follower member fixedly mounted on pump housing 30. The cam is angularly oriented with respect to passage 43 in piston 29 to impart rising and falling motion thereto coordinated with the porting of supply duct 41 and discharge duct 42 to the open cylinder chamber. A compression spring 49 is coaxially mounted on piston 29 and biased between cam 46 and the interior of the cup of worm gear 45 to force the cam against stud 48.

In operation piston 29 is turned around its longitudinal axis by the crankshaft of the engine by means of worm 44 and worm gear 45. Passage 43 is in this manner alternately registered with intake duct 41 and discharge duct 42. As the piston is rotated, it is reciprocated along its axis through action of lifting cam 46 against spring 49 and stud 48. The orientation of elements is such that the piston is lifted when it registers with the supply duct 41 (see the broken line representation) and is lowered when it faces discharge duct 42 (as shown in full lines). In this manner, the cylinder chamber 50 below piston 29 is filled when the passage 43 is in communication with intake duct 41 and oil therein is displaced by downward movement of piston 29 when the passage 43 communicates with discharge duct 42.

The stroke of piston 29 is adjusted by means of a sleeve 27 to which a cable pulley 28 is secured. Sleeve 27 is journaled around housing 30 of the pump 3 in the region enclosing piston 29. As best seen in FIG. 7, sleeve 27 has a slot 31 inclined with respect to its longitudinal axis and extending around a portion of its circumference. A pin 32 fixedly secured in housing 30 and extending into slot 31 provides a follower for the camming surfaces of the walls of slot 31. A torsion spring 33 coaxial with sleeve 27 is connected to the cable pulley 28 at one end and at the other end to a cover 34 fixed on the pump housing 30. A lift plate 35 abuts the upper end of sleeve 27 and pulley 28 and is fixed against axial motion relative to piston 29 by nut 26.

Displacement of cable 12 to the right as viewed in FIGS. 5 and 6 alters the stroke of the piston 29 by raising the piston so that its stroke imparted by the lift of cam 46 is reduced. This reduces the output of the pump for each revolution of the crankshaft of engine 1. The maximum rotary motion of sleeve 27 is limited by the length of slot 31 and the range stroke adjustment depends upon the difference in position along the axis of the piston of the extremes of the slot. As the slot walls engaging pin 32 fall along the axis of the sleeve, the fixed pin causes the sleeve and pulley 28 to be lifted with respect to the housing 30. The engagement of sleeve 27 with plate 35 raises the piston 29 relative to housing 30 so that the falling face of cam 46 does not follow stud 48 over the entire arc of travel of that face and the intake stroke of the piston 29 is reduced. The degree of reduction of stroke is a function of the amount of rotary motion of cable pulley 28 for a given slot inclination. The resultant reduction of the piston stroke diminishes the quantity of oil displaced to the discharge duct 42 for each revolution of the engine crankshaft.

Release of cable 12 toward the left as viewed in FIGS. 5 and 6 permits torsion spring 33 to move the sleeve 27 with cable pulley 28 clockwise so that fixed pin 32 moves relative to slot 31 to the right as viewed in FIG. 7. This permits the lifting plate 35 to be moved toward housing 30 under the influence of compression spring 49 so that cam 46 rests on stud 48 during a greater portion of the revolution of piston 29 to increase the stroke of the piston. At the limit, when pin 32 is at the right-hand end of slot 31, the cam 46 follows stud 48 throughout each piston rotation and a maximum stroke results. A failure of cable 12 sets the pump at maximum.

Figure 8:
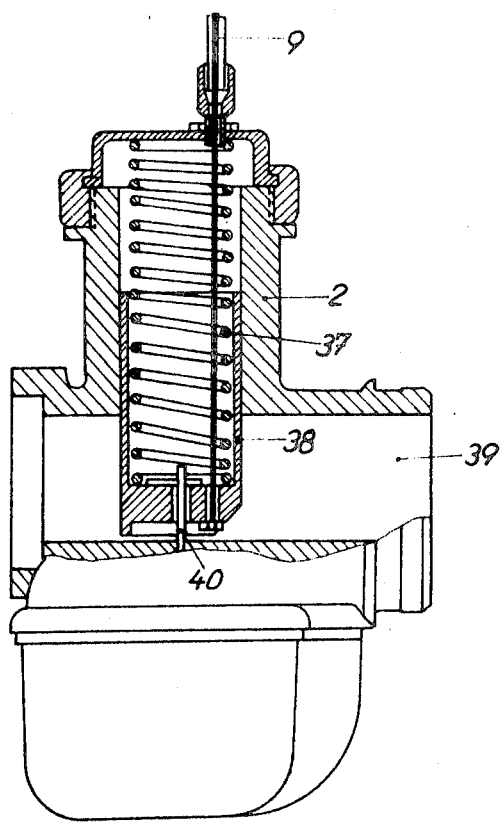
FIG. 8 is a side elevation with portions broken away and sectioned of a carburetor.

FIG. 8 shows a conventional carburetor 2 having a piston 38 biases by compression spring 37 toward the closed position. The illustrated closed position represents the no-load setting for the engine 1. Tension applied by Bowden cable 9 lifts piston 38 to increase the load setting for the engine. A failure of cable 9 closes duct 39 by advancing piston 38. The carburetor needle valve is designated as 40.

The invention as described lends itself to modification and variations as the actuating means and linkages, accordingly it is to be understood that the above description is to be read as illustrative and not in a limiting sense.

I claim:

1. An internal combustion engine comprising, a crankshaft, a throttle, a lubricant supply means having an output per crankshaft revolution which is adjustable, adjustment means for said lubricant supply means to adjust said output, a control linkage to said throttle and said adjustment means arranged to coordinate said throttle and adjustment means setting whereby an increased engine output setting results in an increased output per crankshaft revolution setting for said lubricant supply, and biasing means coupled to said adjustment means for driving said adjustable lubricant supply means toward a maximum output per crankshaft revolution setting when said adjustment means is unconstrained by said control linkage.

2. A combination according to claim 1 wherein said lubricant supply means is an adjustable output pump.

3. A combination according to claim 1 wherein said control linkage comprises a first cable to said throttle, a spring biasing said first cable to drive said throttle toward the position of no load setting, a second cable to said adjustment means, said biasing means comprising a spring biasing said second cable, and a common operating device coupled to said first and second cables and adapted to move said cables in opposite sense.

4. A combination according to claim 3 wherein said first and second cables are Bowden cables.

5. A combination according to claim 3 wherein said common operating device is a two armed lever with said first cable connected to a first arm thereof and said second cable connected to a second arm thereof.

6. A combination according to claim 3 wherein said common operating device is a slider, and a guide for said slider to adapt said slider for for reciprocating motion.

7. A combination according to claim 3 wherein said common operating device is a rotatable element and said cables are attached to said rotating element and each have a portion extending around the axis of rotation of said rotating element from opposite sides thereof.

8. A combination according to claim 2 wherein said biasing is a torsion spring tending to bias said adjustment means to urge said pump toward the maximum supply setting.

9. A combination according to claim 3 including a carburetor for said engine and wherein said first spring is a compression spring functioning as a control element of a throttle on said carburetor.

* * * * *